M. SHLOSBERG.
MUFFLER FOR AUTOMOBILES.
APPLICATION FILED JUNE 22, 1911.
1,023,225.
Patented Apr. 16, 1912.
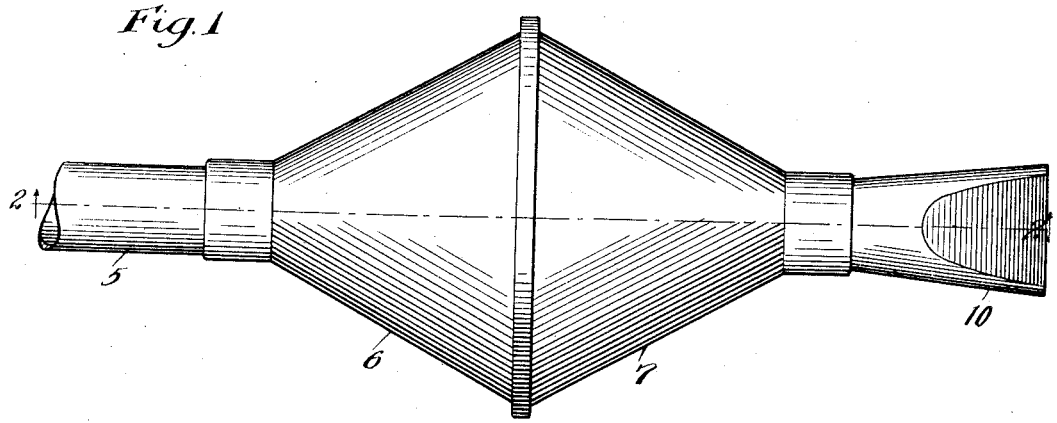
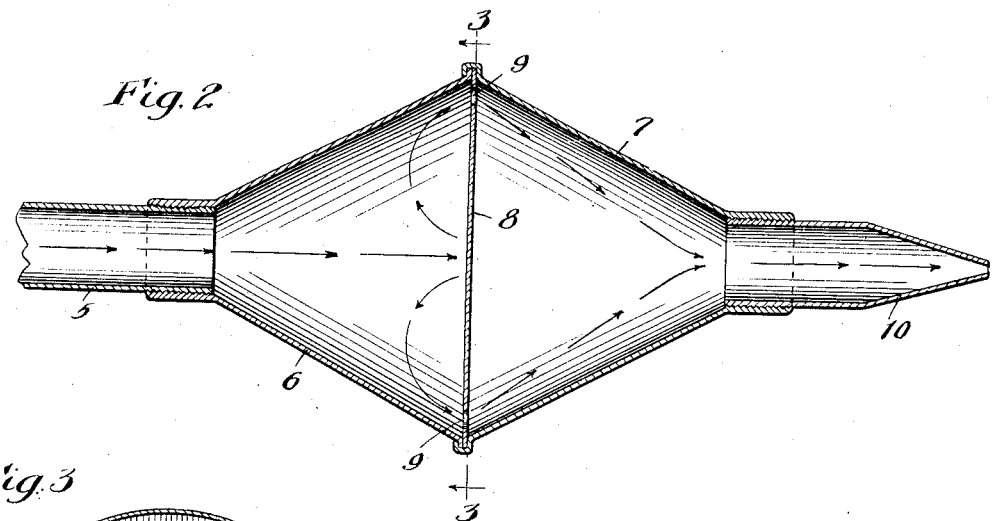
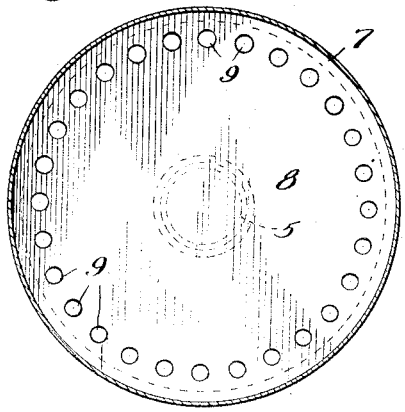
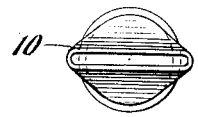
Witnesses:
Inventor:
Maris Shlosberg
By Munday, Evarts, Adcock & Clarke
His Attys.

UNITED STATES PATENT OFFICE.

MARIS SHLOSBERG, OF CHICAGO, ILLINOIS, ASSIGNOR OF ONE-HALF TO McKENZIE CLELAND, OF CHICAGO, ILLINOIS.

MUFFLER FOR AUTOMOBILES.

1,023,225.  Specification of Letters Patent.  Patented Apr. 16, 1912.

Application filed June 22, 1911. Serial No. 634,713.

*To all whom it may concern:*

Be it known that I, MARIS SHLOSBERG, a subject of the Empire of Russia, residing in Chicago, in the county of Cook and State of Illinois, have invented a new and useful Improvement in Mufflers for Automobiles, of which the following is a specification.

This invention is intended to serve as a means for muffling or deadening the sound of the exhaust from automobiles and other motor vehicles.

The invention is fully set forth in the subjoined description and will be clearly understood from such description when considered in connection with the drawing accompanying the same.

In such drawing, Figure 1 is an elevation of the invention. Fig. 2 is a section on the line 2—2 of Fig. 1; Fig. 3 is a section on the line 3—3 of Fig. 2. Fig. 4 is an end view of the escape nozzle.

In said drawing 5 represents the exhaust pipe of the engine of an automobile or motor cycle, and my improved muffler is mounted upon it as seen.

The muffler consists of two hollow cones 6 and 7 secured together at their bases, by overlapping the metal of one on to a flange of the other. Between the cones and secured in the joint between them, a division plate 8 is inserted. This plate divides the cones into separate chambers, in each of which the exhaust is deprived of some portion of its noise, and such chambers communicate with each other through a series of holes 9 formed in the plate 8 near its outer periphery, as seen at Fig. 3. The exhaust enters the cone 6 first, and having then considerable force projects itself directly against the central portion of the division plate. From the division plate, it rebounds, and having thus been deprived of the major part of its power, it then falls into the current leading to the perforations at the rim of the plate and so passes into cone 7. When it reaches the latter, if it still has any propulsive force left in it, it will strike the inclined wall of cone 7 immediately above the perforations 9, and such wall is adapted to deflect and does deflect it toward the center of the cone where it is drawn into the current leading to the escape nozzle 10. This nozzle has a contracted or flattened end as shown adapted to confine any noise within the muffler and prevent its escape to the outer air, and also to further take from the exhaust any remainder which may exist in it of its original propelling power. The nozzle is affixed to the small end of the cone 7, and the like end of cone 6 is attached to the exhaust pipe.

The device is very simple, but is exceedingly effective, and renders the engine almost entirely noiseless.

I claim:—

1. The muffler for automobiles and other self propelling vehicles, provided with a hollow cone the small end of which is joined to the exhaust pipe of the vehicle, and the large end of which is closed by a flat plate having its openings for the escape of the exhaust located near the periphery of the plate.

2. The muffler for automobiles and other self propelling vehicles, consisting of a pair of hollow cones secured together at their bases and separated by a divisional plate having the only communicating openings between the cones located near its periphery, one of said cones being joined at its small end to the exhaust pipe of the engine, and the other cone being connected at its small end to the escape nozzle.

MARIS SHLOSBERG.

Witnesses:
PEARL ABRAMS,
EDW. S. EVARTS.